(12) United States Patent
Hiben et al.

(10) Patent No.: US 9,119,123 B2
(45) Date of Patent: Aug. 25, 2015

(54) METHOD AND APPARATUS FOR PERFORMING WI-FI OFFLOAD WITHOUT INTERRUPTING SERVICE

(71) Applicant: Motorola Solutions, Inc., Schaumburg, IL (US)

(72) Inventors: Bradley M. Hiben, Glen Ellyn, IL (US); Kiran Vaya, Streamwood, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 54 days.

(21) Appl. No.: 13/799,681

(22) Filed: Mar. 13, 2013

(65) Prior Publication Data

US 2014/0269610 A1 Sep. 18, 2014

(51) Int. Cl.
*H04W 36/14* (2009.01)
*H04W 48/18* (2009.01)
*H04W 8/12* (2009.01)
*H04W 84/12* (2009.01)
*H04W 76/06* (2009.01)

(52) U.S. Cl.
CPC ............. *H04W 36/14* (2013.01); *H04W 48/18* (2013.01); *H04W 8/12* (2013.01); *H04W 76/068* (2013.01); *H04W 84/12* (2013.01)

(58) Field of Classification Search
USPC ......................................................... 370/331
See application file for complete search history.

(56) References Cited

U.S. PATENT DOCUMENTS

| 2003/0117978 A1 | 6/2003 | Haddad |
| 2007/0121580 A1* | 5/2007 | Forte et al. ............. 370/351 |
| 2007/0178905 A1 | 8/2007 | El Mghazli et al. |
| 2008/0102787 A1 | 5/2008 | Landschaft et al. |
| 2011/0310799 A1* | 12/2011 | Horn et al. .............. 370/328 |
| 2012/0008578 A1* | 1/2012 | Kant et al. .............. 370/329 |
| 2012/0044908 A1 | 2/2012 | Spinelli |
| 2012/0077461 A1 | 3/2012 | Das |
| 2012/0127974 A1 | 5/2012 | Doppler |

(Continued)

FOREIGN PATENT DOCUMENTS

| EP | 2254382 A2 | 11/2010 |
| EP | 2309796 A1 | 4/2011 |

(Continued)

OTHER PUBLICATIONS

Corresponding International Application No. PCT/US2014/020094—International Search Report Dated Nov. 14, 2014.

*Primary Examiner* — Jenee Williams
(74) *Attorney, Agent, or Firm* — Steven A. May

(57) ABSTRACT

A network node receives a first connection request from user equipment to join a broadband network at a first interface. A mobility manager in the network node accepts the first connection request. The mobility manager sends data from a core network addressed to the user equipment and receives data from the user equipment through the first interface. The mobility manager receives, from a local area network, a second connection request sent from the user equipment. The second connection request is for the user equipment to communicate with the broadband network via the local area network. The mobility manager accepts the second connection request and offloads data transmitted to and received from the user equipment to a second interface on the network node. The second interface is configured to send data to and receive data from the user equipment via the local area network.

18 Claims, 8 Drawing Sheets

(56) References Cited

U.S. PATENT DOCUMENTS

2012/0184284 A1 7/2012 Moisio
2013/0070641 A1* 3/2013 Meier et al. .................. 370/254
2013/0097674 A1* 4/2013 Jindal et al. .................. 709/227
2013/0324114 A1* 12/2013 Raghothaman et al. ... 455/426.1

FOREIGN PATENT DOCUMENTS

WO 2006124948 A1 11/2006
WO 2011098658 A1 8/2011

* cited by examiner

METHOD AND APPARATUS FOR PERFORMING WI-FI OFFLOAD WITHOUT INTERRUPTING SERVICE

FIELD OF THE DISCLOSURE

The present disclosure relates generally to offloading broadband traffic from a cellular wide area network to a local area network, and more particularly, to reducing load on the cellular wide area network and/or mitigating interference, without interrupting service or reducing quality of service (QoS) for certain types of traffic.

BACKGROUND

Cellular broadband systems, such as Long Term Evolution (LTE) systems, deliver higher mobile download speeds and thereby allow for increased data usage on mobile devices, such as laptops, smart phones, and tablets. Although network operators are attempting to address the challenge of increased data usage by upgrading cellular Wide Area Networks (WANs), in some cases, network upgrades may not be adequate. An increasing number of mobile devices have local area network (LAN) capabilities, wherein data originally targeted for cellular networks may be delivered via, for example, wireless-fidelity (Wi-Fi) or femtocell networks. The handover of data originally targeted for cellular networks to, for example, a Wi-Fi network is referred to herein as "Wi-Fi offload".

Depending on the mobile device and/or cellular network involved in the Wi-Fi offload, when the mobile device connects to the Wi-Fi network, a new IP address is assigned to the mobile device by the Wi-Fi network. Thereafter, all new communications directed to the mobile device can use the new IP address. Although established connections can still continue over the cellular network, some mobile devices and/or cellular networks may be configured to disable the cellular network connections when the mobile device establishes connection with the Wi-Fi network. The previously established connection with the cellular network is thereafter reestablished over Wi-Fi, using the new IP address. This broken connection may result in service interruption and degrade the user experience. In addition, traffic sent via Wi-Fi may be sent over the Internet, which provides for only best-effort delivery but does not provide any guarantees that data is delivered or that a user is given a guaranteed quality of service (QoS) level or a certain priority. Unlike the Internet which provides for only best-effort delivery, the LTE core network provides QoS, i.e., the ability to provide different priorities to different applications, users, or data flows, or to guarantee a certain level of performance to a data flow, so that real time traffic, like voice calls, will have better performance.

In order to maintain the data connection during Wi-Fi offload, the network operator may use a virtual private network (VPN). A VPN extends resources used on a private network across public networks like the Internet. The VPN enables host devices to establish virtual point-to-point connections through the use of dedicated connections and/or encryption, and to send and receive data across public networks as if it were a private network with all the functionality, security and management policies of the private network. However, using a VPN to maintain the data connection during Wi-Fi offload increases the cost of operating the cellular network and does not provide for controlling quality of service.

FIG. 1 is a block diagram of an LTE system that may be used during Wi-Fi offload. The LTE system includes, among other components, a core network 104 and one or more evolved Node Bs (eNBs) 102 (that is, eNBs 102a, 102b, and 102c). The core network 104 includes a serving gateway 114 and a mobility management entity (MME) 116. Serving gateway 114 routes incoming and outgoing internet protocol (IP) packets and handles handover between eNBs 102 and MME 116 handles signaling related to mobility and security. Each eNB 102 functions as a base station for the LTE system and includes an LTE radio 112 (that is, LTE radios 112a, 112b, and 112c) for forwarding user data and signaling between core network 104 and user equipment (UE) 106 operating on the LTE system. Application servers 121 may be directly link to the core network 104 to enhance quality of service for certain types of applications, such as telephony. Other application servers 120 may also be linked to core network 104 through the Internet 130.

UE 106 includes a connection manager 107 that determines where to route data from the various applications. For example, connection manager 107 may route data through the LTE system via an LTE modem 108 of user equipment 106 or through a Wi-Fi interface via a Wi-Fi modem 109 of the user equipment. If user equipment 106 is performing Wi-Fi offload, data is routed from user equipment 106 via Wi-Fi modem 109 to a Wi-Fi access point (AP) 110 which is connected to the Internet 130 outside of the cell system. This may cause a change in the IP address and/or may cause loss of QoS control and may affect the performance of some applications. Packets sent during Wi-Fi offload over the Internet 130 using "best effort" delivery may be adequate for some applications, such as file downloads or financial transactions, but may not be acceptable for some services, such as real time voice and video services. Therefore, cellular operators that provide Wi-Fi offload capability in user equipment 106 typically may not offload telephone calls, but rather keep them on core network 104 to control QoS, while offloading other data services to Wi-Fi, thereby limiting the amount of data offloaded to the Wi-Fi network.

Two broadband systems may occupy adjacent spectrum such as occurs in the upper 700 MHz band in the United States of America. This may result in interference in locations covered by a first broadband system that are near locations covered by a second broadband system. For example, undesired, adjacent channel signals with high strength from the second broad band system may cause interference in locations covered by the first broadband system. In addition, there may also be interference in the first broadband system based on the strength of a desired signal in first broadband system. For example, if the strength of the desired signal from the first broadband system is weak in locations covered by the first broadband system that are farther away from the LTE cell site, these locations may have larger areas of interference than locations that are closer to the LTE cell site. Therefore, a mobile device in a location with interference from, for example, a weak or undesired signal may be configured to offload to a Wi-Fi network.

Accordingly, there is a need for an improved method and apparatus for offloading broadband traffic from a cellular wide area network to a Wi-Fi network and for reducing load on the cellular wide area network and/or mitigating interference, without interrupting service or reducing quality of service for certain types of traffic.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
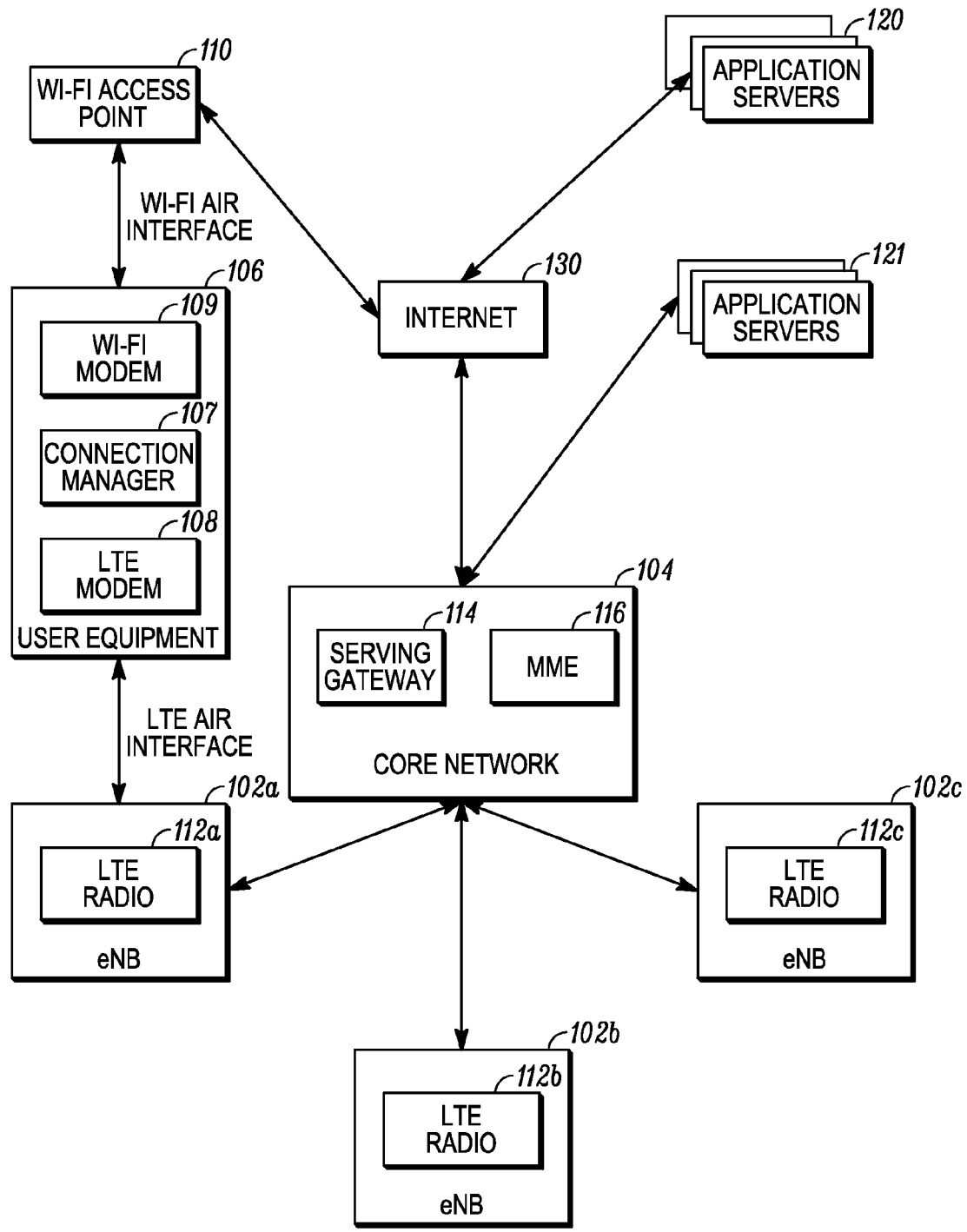
FIG. 1 is a block diagram of an LTE system that may be used during Wi-Fi offload.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for offloading broadband traffic from a cellular wide area network to a Wi-Fi local area network and for reducing load on the cellular wide area network and/or mitigating interference, without interrupting service or reducing quality of service. A first connection request to join a broadband network is received from a user equipment, over a cellular wide area network, at a first interface on a network node. A mobility manager in the network node accepts the first connection request. The mobility manager sends data from a core network addressed to the user equipment and receives data from the user equipment through the first interface. The mobility manager receives, from a local area network, a second connection request sent from the user equipment. The second connection request is for the user equipment to communicate with the broadband network via the local area network. The mobility manager accepts the second connection request and offloads data transmitted to and received from the user equipment to a second interface on the network node. The second interface is configured to send data to and receive data from the user equipment via the local area network.

Figure 2:
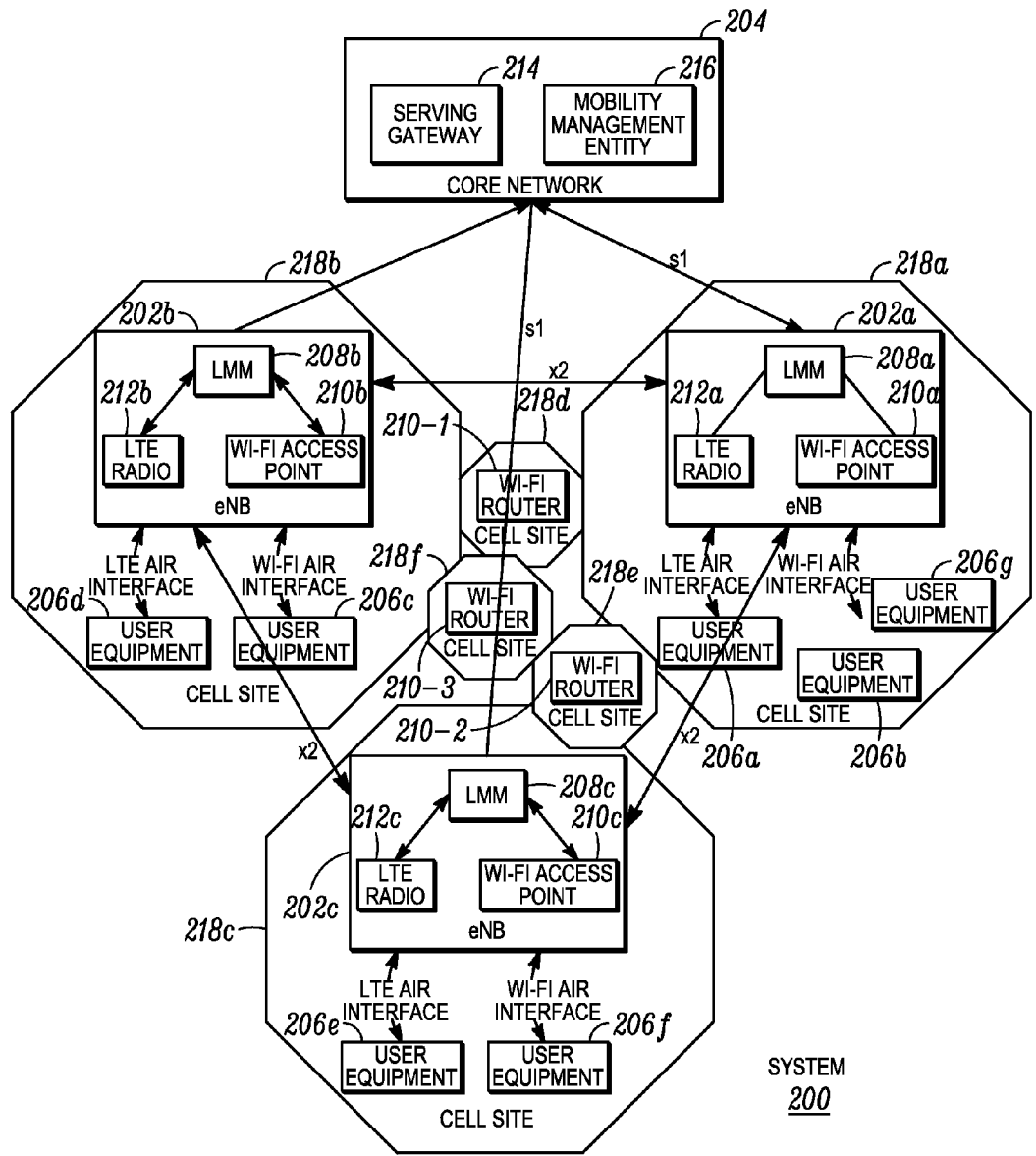
FIG. 2 is a block diagram a broadband system used in accordance with some embodiments.

FIG. 2 is a block diagram a broadband system used in accordance with some embodiments. System 200 illustrates elements of a Long Term Evolution (LTE) system, although any broadband system may be used. System 200 includes multiple evolved Node Bs (eNBs) 202 (that is, eNBs 202a, 202b, and 202c), each of which communicates directly with a core network 204 and with one or more of multiple user equipments 206 (that is, user equipments 206a-206g), such as mobile phones, tablets or laptops. Core network 204 includes a serving gateway 214 and a mobility management entity 216. Serving gateway 214 routes incoming and outgoing internet protocol (IP) packets and handles handover between eNBs 202. Mobility management entity 216 handles signaling related to mobility and security.

Each eNB 202 manages radio resources and mobility in a corresponding one or more cell sites 218 (that is, cell sites 218a, 218b, and 218c) to optimize communication with connected user equipments 206. Each eNB 202 provides coverage to one or more cells. For example, eNB 202a provides coverage to a cell associated with cell site 218a, eNB 202b provides coverage to a cell associated with cell site 218b, and eNB 202c provides coverage to a cell associated with cell site 218c. Therefore, each user equipment 206 in a cell sends information to and receives information from core network 204 through the eNB 202 in the cell in which the user equipment operates. eNBs 202 may be connected to each other in a meshed fashion, i.e., eNBs 202 may possibly be linked together to minimize packet loss due to user equipments 206 movements. As, for example, user equipment 206a moves across the network and disconnects from eNB 202a and connects to eNB 202b, unsent or unacknowledged packets stored in a queue in eNB 202a may be forwarded or tunneled to eNB 202b via an x2 interface that connects eNBs 202a and eNB 202b.

Each eNB 202 includes a first interface comprising an LTE radio 212 (that is, LTE radios 212a, 212b, and 212c) that modulates and demodulates radio frequency signals according to an LTE standard. LTE radio 212 in each eNB 202 is for handling communication on an LTE air interface (also referred to herein as a first air interface). Each eNB 202 also includes a second interface comprising a Wi-Fi access point 210 (that is, Wi-Fi access points 210a, 210b, and 210c) that enables Wi-Fi offloading, wherein the Wi-Fi access point 210 in each eNB 202 is for handling communication on a Wi-Fi air interface (also referred to herein as a second air interface). Each of Wi-Fi access points 210a, 210b, and 210c (also called a home node) and each of LTE radios 212a, 212b, and 212c has a wired or backplane connection to a Local Mobility Manager (LMM) 208 (that is, LMMs 208a, 208b, and 208c) in a respective eNB 202. LMM 208 in each eNB 202, autonomously from the core network 204, keeps track of whether user equipment 206 is using the LTE air interface or the Wi-Fi air interface to avoid breaking the IP connection when a user equipment 206 switches from the LTE air interface to Wi-Fi air interface. System 200 further includes multiple Wi-Fi routers 210-1, 210-2, and 210-3 that are relay nodes and that are located at cell sites adjacent to eNBs 202a-202c. Relay nodes 210-1, 210-2, and 210-3 wirelessly relay data between user equipment 206 and home nodes 210a, 210b, and 210c.

Figure 3:
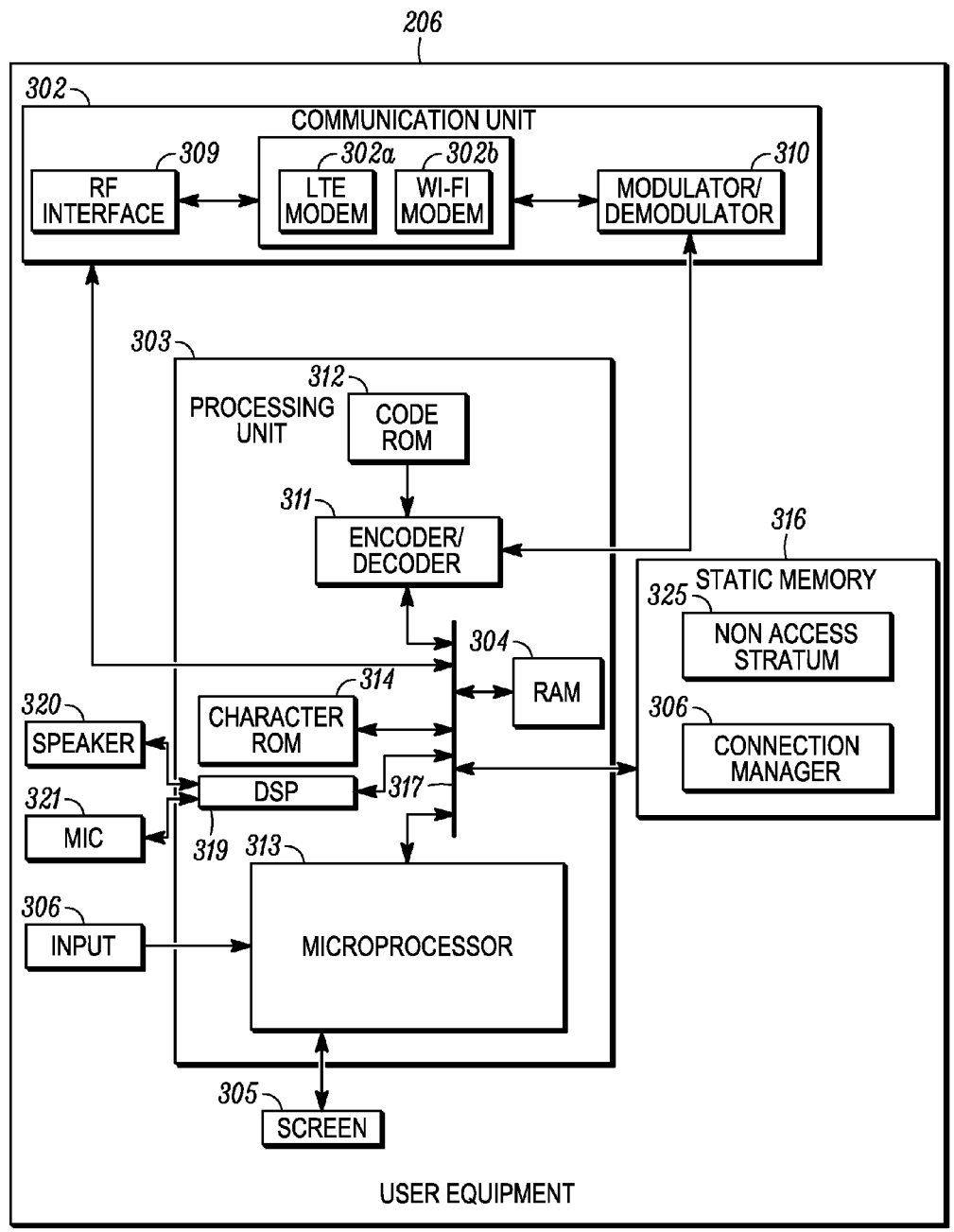
FIG. 3 is a block diagram of a user equipment used in accordance with some embodiments.

FIG. 3 is a block diagram of a user equipment 206 used in accordance with some embodiments. The user equipment 206 includes a communications unit 302 coupled to a common data and address bus 317 of a processing unit 303. The user equipment 206 may also include an input unit (e.g., keypad, pointing device, etc.) 306, an output transducer unit (e.g., speaker) 320, an input transducer unit (e.g., a microphone) (MIC) 321, and a display screen 305, each coupled to be in communication with the processing unit 303.

The processing unit 303 may include an encoder/decoder 311 with an associated code ROM 312 for storing data for encoding and decoding voice, data, control, or other signals that may be transmitted to or received from eNBs or other user equipment. The processing unit 303 may further include a microprocessor 313 coupled, by the common data and address bus 317, to the encoder/decoder 311, a character ROM 314, a RAM 304, and a static memory 316. The processing unit 303 may also include a digital signal processor (DSP) 319, coupled to the speaker 320, the microphone 321, and the common data and address bus 317, for operating on audio signals received from one or more of the communications unit 302, the static memory 316, and the microphone 321.

The communications unit 302 may include an RF interface 309 configurable to communicate with eNBs, and other user equipment within its communication range. RF interface 309 may include a first interface for interfacing with the LTE air interface and a second interface for interfacing with the Wi-Fi air interface. The communications unit 302 may include one or more broadband and/or narrowband transceivers, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The communications unit 302 may include one or more local area network or personal area network transceivers such as Wi-Fi transceiver perhaps operating in accordance with an IEEE 802.11 standard (e.g., 802.11a, 802.11b, 802.11g), or a Bluetooth transceiver, for subscriber device to subscriber device communications. The transceivers may be coupled to a combined modulator/demodulator 310 that is coupled to the encoder/decoder 311. The character ROM 314 stores code for decoding or encoding data such as control, request, or instruction messages, channel change messages, and/or data or voice messages that may be transmitted or received by the user equipment 206.

In some embodiments, the transceivers may include a cellular wide area network modem 302a (also referred to as an LTE modem 302a) and a local area network modem 302b (also referred to as a Wi-Fi modem 302b). LTE modem 302a enables, for example, user equipment 206 to send data to and receive data from an eNB 202 over the LTE air interface. Wi-Fi modem 302b enables, for example, user equipment 206 to send data to and receive data from an eNB 202 over the Wi-Fi air interface, wherein user equipment 206 entering a Wi-Fi coverage area may switch from sending and/or receiving data from the LTE air interface to the Wi-Fi air interface.

LTE modem 302a and Wi-Fi modem 302b are both under the control of a connection manager. Static memory 316 may store operating code 306 for the connection manager that, when executed by processing unit 303, causes the connection manager which is part of the air interface control plane to send signaling between user equipment 206 and an eNB 202. In particular, the connection manager enables user equipment 206 entering a Wi-Fi coverage area to switch from sending and/or receiving data from the LTE air interface to the Wi-Fi air interface. For example, an "advertisement" message can be transmitted from a Wi-Fi access point providing service to the cell where the user equipment is located. The advertisement could trigger the connection manager to use the Wi-Fi access point, instead of the cellular network. Static memory 316 may also store operating code 325 for non-access stratum (NAS) messaging, which is the highest stratum of the control plane between user equipment 206 and mobility management entity 216. When executed by processing unit 303, code for NAS 325 exchanges information related to user equipment 206 mobility and session management procedures to establish and maintain IP connectivity between user equipment 206 and serving gateway 214.

Returning to FIG. 2, a Wi-Fi home node, for example, Wi-Fi access point 210a, periodically broadcasts transmissions that advertise the availability of Wi-Fi access point 210a. Similarly, the LTE radio 212a advertises the presence of an LTE cell site using standard LTE signaling. When, for example, user equipment 206a joins the network, user equipment 206a uses the LTE air interface to send an attachment message (also referred to herein as a first connection request) to LTE radio 212a in eNB 202a in order to attach to the LTE side of cell site 218a. LTE radio 212a forwards the attachment message to LMM 208a which forwards the attachment message to core network 204. Core network 204 can thereafter send data to and/or receive data from user equipment 206a on the first air interface, wherein the data transmitted from core network 204 to user equipment 206a is sent from core network 204 to LMM 208a, from LMM 208a to LTE radio 212a and from LTE radio 212a to user equipment 206a via the LTE air interface; and data transmitted from user equipment 206a to core network 204 is sent in the reversed order.

Subsequent to attaching to the LTE network, when user equipment 206a moves into range of, for example, Wi-Fi access point 210a and receives the advertisement from Wi-Fi access point 210a, user equipment 206a may send a Wi-Fi connect message (also referred to herein as a second connection request) to request connection to Wi-Fi access point 210a. Wi-Fi access point 210a forwards the Wi-Fi connect message to LMM 208a which thereafter routes data addressed to user equipment 206a through the second air interface, wherein data transmitted from core network 204 to user equipment 206a is sent from core network 204 to LMM 208a, from LMM 208a to Wi-Fi access point 210a via the Wi-Fi air interface, and from Wi-Fi access point 210a to user equipment 206a; and data transmitted from user equipment 206a to core network 204 is sent in the reversed order. Subsequent to receiving the connect message, LMM 208a sets an offload timer associated with the LMM to expire after a defined time period. If user equipment 206a does not transmit data on the Wi-Fi air interface within the defined time period, LMM 208a routes data addressed to user equipment 206a through the LTE air interface, i.e., the first air interface.

When user equipment 206a goes out of range of Wi-Fi access point 210a, user equipment 206a sends a release message to LTE radio 212a. LTE radio 212a forwards the release message to LMM 208a. This releases the Wi-Fi connection between user equipment 206a and Wi-Fi access point 210a. Thereafter, the data addressed to user equipment 206a is sent on the first air interface, that is, from core network 204 to LMM 208a, from LMM 208a to LTE radio 212a, and from LTE radio 212a to user equipment 206a via the LTE air interface; and data is transmitted from user equipment 206a to core network 204 in the reversed order.

The release message may be an application-level message that can be intercepted by LMM 208a. Subsequent to receiving the release message, LMM 208a cancels the offload timer. In some embodiments, the release message could be made at the non-access stratum. After receiving the release message, LMM 208a routes data to/from user equipment 206a through the first air interface, i.e., the LTE air interface.

Figure 4:
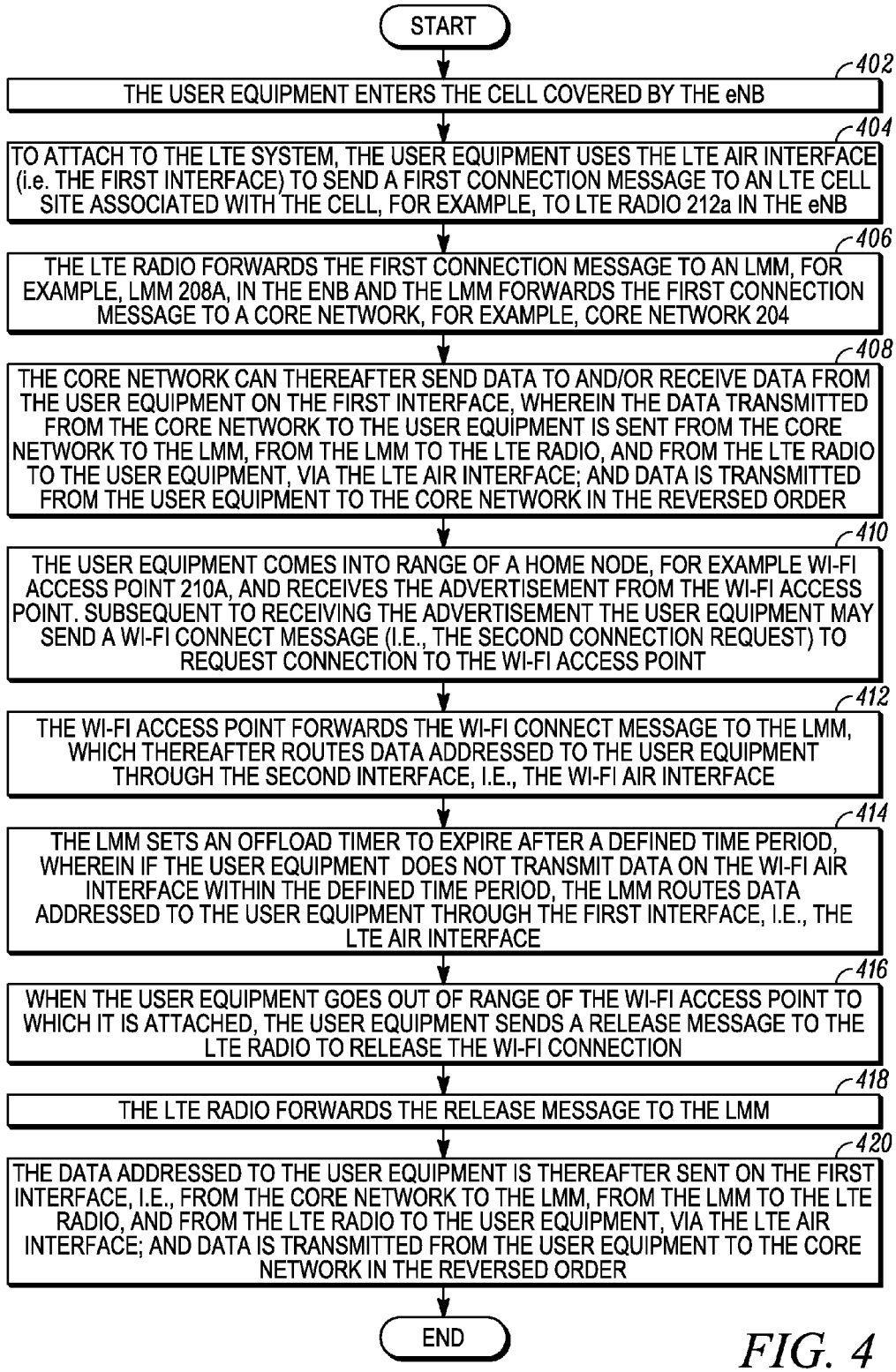
FIG. 4 is a flow diagram of how the user equipment attaches to a cellular network or a Wi-Fi network in accordance with some embodiments.

FIG. 4 is a flow diagram of how a user equipment, such as user equipments 206a-206g, attaches to a cellular network or a Wi-Fi network in accordance with some embodiments. When the user equipment, for example, user equipment 206a of FIG. 2, joins the network, user equipment 206a may communicate with the components of an eNB, for example, eNB 202a. At 402, the user equipment enters the cell covered by the eNB. At 404, to attach to the LTE system, the user equipment uses the LTE air interface (i.e. the first air interface) to send a first connection message to an LTE cell site associated with the cell, for example, to LTE radio 212a in the eNB. At 406, the LTE radio forwards the first connection message to an LMM, for example, LMM 208a, in the eNB and the LMM forwards the first connection message to a core network, for example, core network 204. At 408, the core network can thereafter send data to and/or receive data from the user equipment on the first air interface, wherein the data transmitted from the core network to the user equipment is sent from the core network to the LMM, from the LMM to the LTE radio, and from the LTE radio to the user equipment, via the LTE air interface; and data is transmitted from the user equipment to the core network in the reversed order.

At 410, the user equipment comes into range of a home node, for example, Wi-Fi access point 210a, and receives the advertisement from the Wi-Fi access point. The advertisement may be an application-level message sent using standard broadcast and/or multicast addressing provided by Wi-Fi and/or the Internet Protocols. The message may include a field that identifies the LTE cell site so that the user equipment can know that the Wi-Fi access point provides offload through the LTE cell site that the user equipment is associated with as opposed to any number of other Wi-Fi sites that may exist in the area. Subsequent to receiving the advertisement the user equipment may send a Wi-Fi connect message (i.e., the second connection request) to request connection to the Wi-Fi access point. The Wi-Fi connect message may contain addressing information found in the advertisement to facilitate connection with the desired Wi-Fi access point in case multiple access points receive the Wi-Fi connect message. At 412, the Wi-Fi access point forwards the Wi-Fi connect message to the LMM, which thereafter routes data addressed to the user equipment through the second air interface, i.e., the Wi-Fi air interface. At 414, the LMM sets an offload timer to expire after a defined time period, wherein if the user equipment does not transmit data on the Wi-Fi air interface within the defined time period, the LMM routes data addressed to the user equipment through the first air interface, i.e., the LTE air interface. At 416, when the user equipment goes out of range of the Wi-Fi access point to which it is attached, the user equipment sends a release message to the LTE radio to release the Wi-Fi connection. At 418, the LTE radio forwards the release message to the LMM. At 420, the data addressed to the user equipment is thereafter sent on the first air interface, i.e., from the core network to the LMM, from the LMM to the LTE radio, and from the LTE radio to the user equipment, via the LTE air interface; and data is transmitted from the user equipment to the core network in the reversed order.

Figure 5:
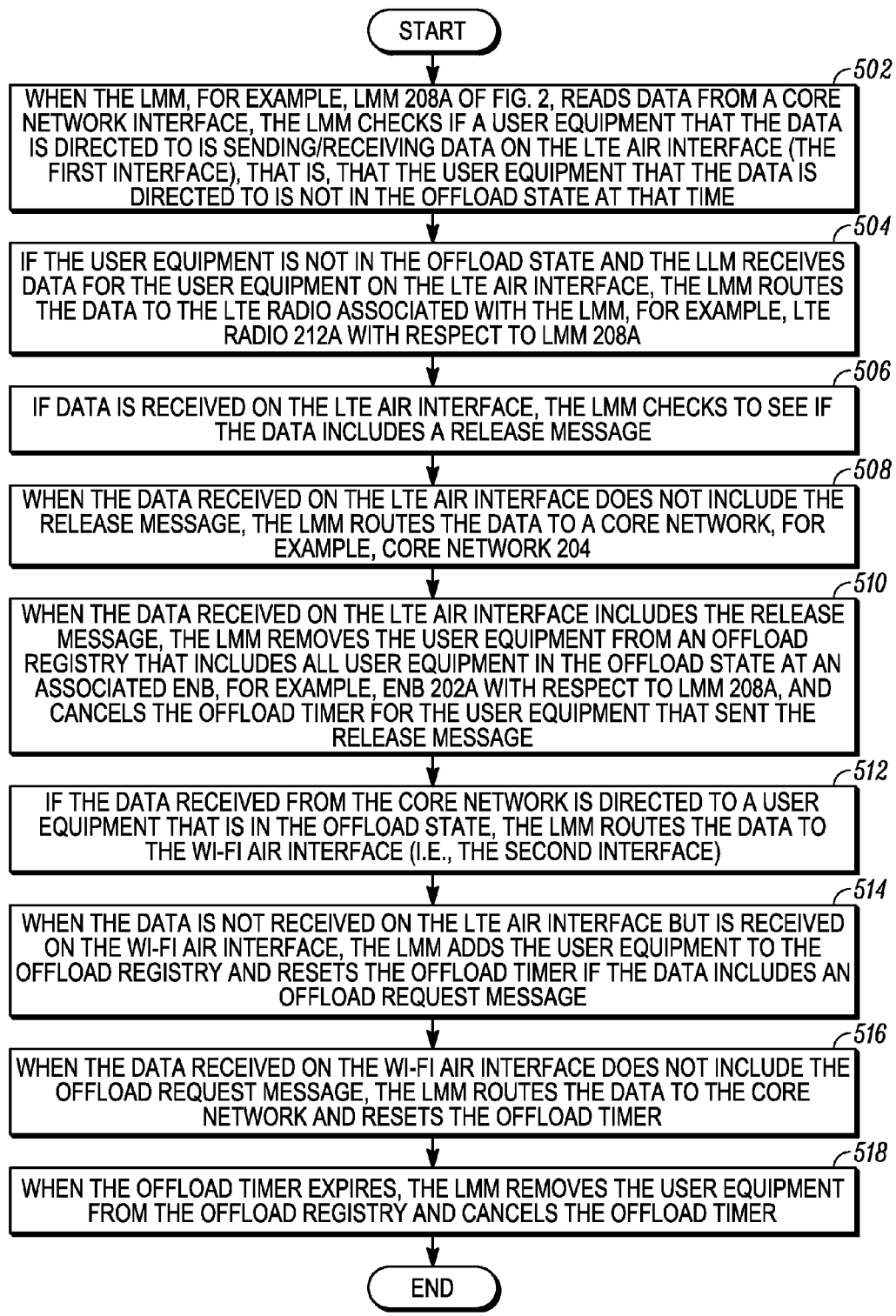
FIG. 5 is a flow diagram of how a local mobility manager processes information in accordance with some embodiments.

FIG. 5 is a flow diagram of how a local mobility manager, such as LMMs 208a, 208b, and 208c, processes information in accordance with some embodiments. At 502, when the LMM, for example, LMM 208a of FIG. 2, reads data from a core network interface, the LMM checks if a user equipment that the data is directed to is sending/receiving data on the LTE air interface (i.e., the first air interface), that is, that the user equipment that the data is directed to is not in the offload state at that time. At 504, if the user equipment is not in the offload state and the LLM receives data for the user equipment on the LTE air interface, the LMM routes the data to the LTE radio associated with the LMM, for example, LTE radio 212a with respect to LMM 208a. At 506, if data is received on the LTE air interface, the LMM checks to see if the data includes a release message. At 508, when the data received on the LTE air interface does not include the release message, the LMM routes the data to a core network, for example, core network 204. At 510, when the data received on the LTE air interface includes the release message, the LMM removes the user equipment from an offload registry that includes all user equipment in the offload state at an associated eNB, for example, eNB 202a with respect to LMM 208a, and cancels the offload timer for the user equipment that sent the release message. At 512, if the data received from the core network is directed to a user equipment that is in the offload state, the LMM routes the data to the Wi-Fi air interface (i.e., the second air interface). At 514, when the data is not received on the LTE air interface but is received on the Wi-Fi air interface, the LMM adds the user equipment to the offload registry and resets the offload timer, if the data includes an offload request message. At 516, when the data received on the Wi-Fi air interface does not include the offload request message, the LMM routes the data to the core network and resets the offload timer. At 518, when the offload timer expires, the LMM removes the user equipment from the offload registry and cancels the offload timer.

Figure 6:
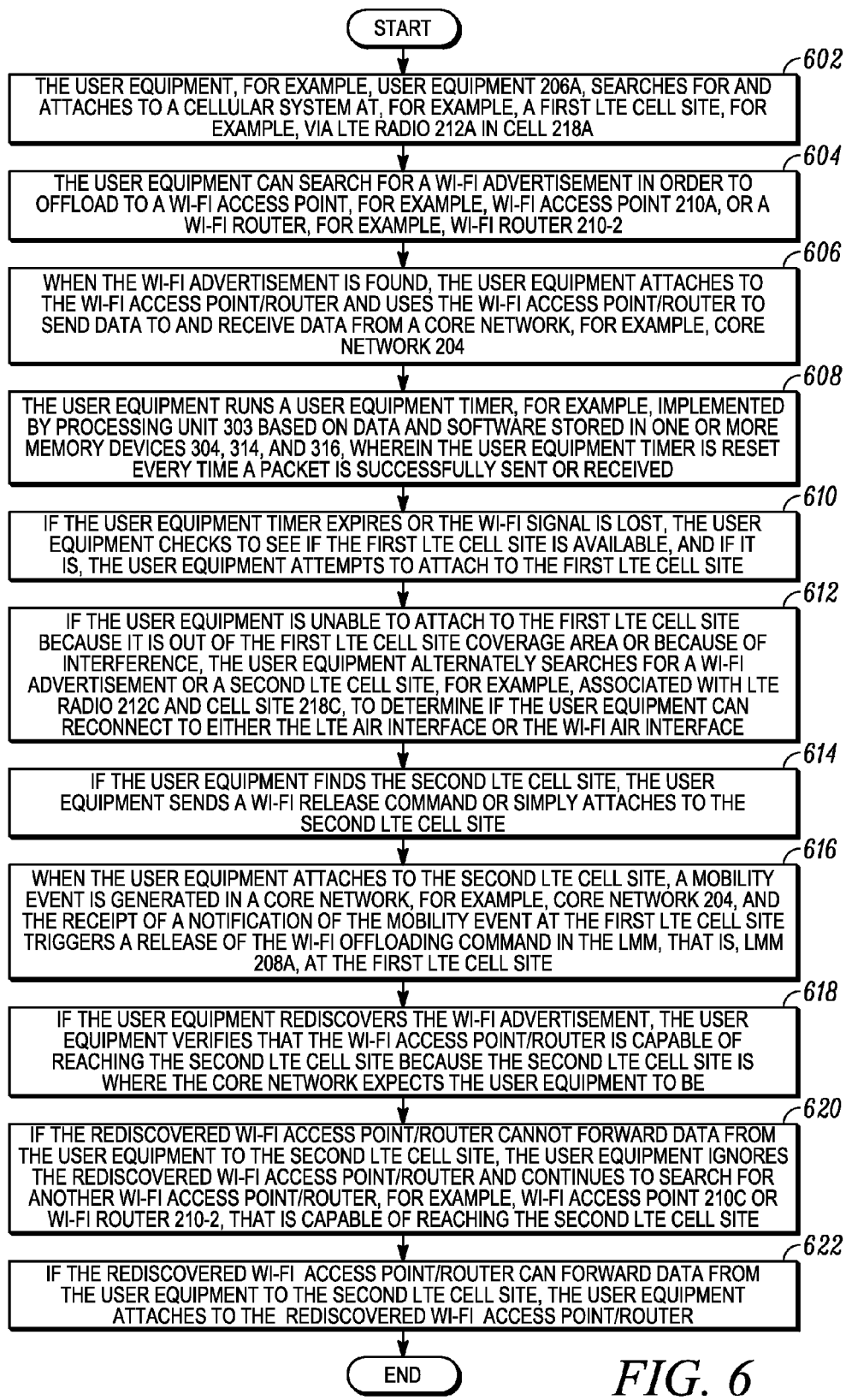
FIG. 6 is a flow diagram for selecting an air interface by the user equipment in accordance with some embodiments.

FIG. 6 shows a flow diagram for selecting an air interface by a user equipment, such as user equipments 206a-206g, in accordance with some embodiments. At 602, the user equipment, for example, user equipment 206a, searches for and attaches to a cellular system at, for example, a first LTE cell site, for example, via LTE radio 212a in cell 218a. At 604, the user equipment can search for a Wi-Fi advertisement in order to offload to a Wi-Fi access point, for example, Wi-Fi access point 210a, or a Wi-Fi router, for example, Wi-Fi router 210-2. At 606, when the Wi-Fi advertisement is found, the user equipment attaches to the Wi-Fi access point/router and uses the Wi-Fi access point/router to send data to and receive data from a core network, for example, core network 204. At 608, the user equipment runs a user equipment timer, for example, implemented by processing unit 303 based on data and software stored in one or more memory devices 304, 314, and 316, wherein the user equipment timer is reset every time a packet is successfully sent or received. At 610, if the user equipment timer expires or the Wi-Fi signal is lost, the user equipment checks to see if the first LTE cell site is available, and if it is, the user equipment attempts to attach to the first LTE cell site. At 612, if the user equipment is unable to attach to the first LTE cell site because it is out of the first LTE cell site coverage area or because of interference, the user equipment alternately searches for a Wi-Fi advertisement or a second LTE cell site, for example, associated with LTE radio 212c and cell site 218c, to determine if the user equipment can reconnect to either the LTE air interface or the Wi-Fi air interface. At 614, if the user equipment finds the second LTE cell site, the user equipment sends a Wi-Fi release command or simply attaches to the second LTE cell site. At 616, when the user equipment attaches to the second LTE cell site, a mobility event is generated in a core network, for example, core network 204, and the receipt of a notification of the mobility event at the first LTE cell site triggers a release of the Wi-Fi offloading command in the LMM, that is, LMM 208a, at the first LTE cell site. At 618, if the user equipment rediscovers the Wi-Fi advertisement, the user equipment verifies that the Wi-Fi access point/router is capable of reaching the second LTE cell site because the second LTE cell site is where the core network expects the user equipment to be. At 620, if the rediscovered Wi-Fi access point/router cannot forward data from the user equipment to the second LTE cell site, the user equipment ignores the rediscovered Wi-Fi access point/router and continues to search for another Wi-Fi access point/router, for example, Wi-Fi access point 210c or Wi-Fi router 210-2, that is capable of reaching the second LTE cell site. At 622, if the rediscovered Wi-Fi access point/router can forward data from the user equipment to the second LTE cell site, the user equipment attaches to the rediscovered Wi-Fi access point/router.

For example, and referring to FIG. 2, Wi-Fi access points 210a, 210b, and 210c (also called home nodes), in the same cell sites as eNBs 202a, 202b, and 202c, have wired or backplane connection to the corresponding LMMs 208a, 208b, 208c in the eNB. Wi-Fi routers 210-1, 210-2, and 210-3 (also called relay nodes) are located in adjacent cell sites and wirelessly relay data between the user equipment and home nodes, and thus provide a routing function. The relay nodes do not have wired backhaul into the core network or into the LMM in the eNB. The relay nodes receive data from nearby user equipment and retransmit the data packets to the home nodes at the LTE cell sites based on the assumption that the home node-to-relay node coverage range is substantially larger than the coverage ranges of home node-to-user equipment and the relay node-to-user equipment. Home nodes broadcast their advertisements as described previously. If a relay node receives the advertisement, it repeats the advertisement adding its own address information to the advertisement. A relay node may repeat the advertisements of several home nodes. When the user equipment enters the coverage area of a relay node and receives the relayed advertisement for a home node, the user equipment can request offloading by indicating which relay node and home node the user equipment wants to use, for example, by using the Wi-Fi connect message. Typically, the user equipment will request offload to the Wi-Fi home node at the cell site at which the user equipment's LTE modem is associated. This can be facilitated by, for example, including an identifier of the LTE cell site in the Wi-Fi advertisement message. Upon receiving an acknowledgement from the relay node, the user equipment is ready to send data through the relay node. When the user equipment attaches to the relay node, a mobility event is not triggered within the LTE system because the LMM in the eNB associated with the user equipment's home node cell site handles the Wi-Fi offload.

Figure 7:
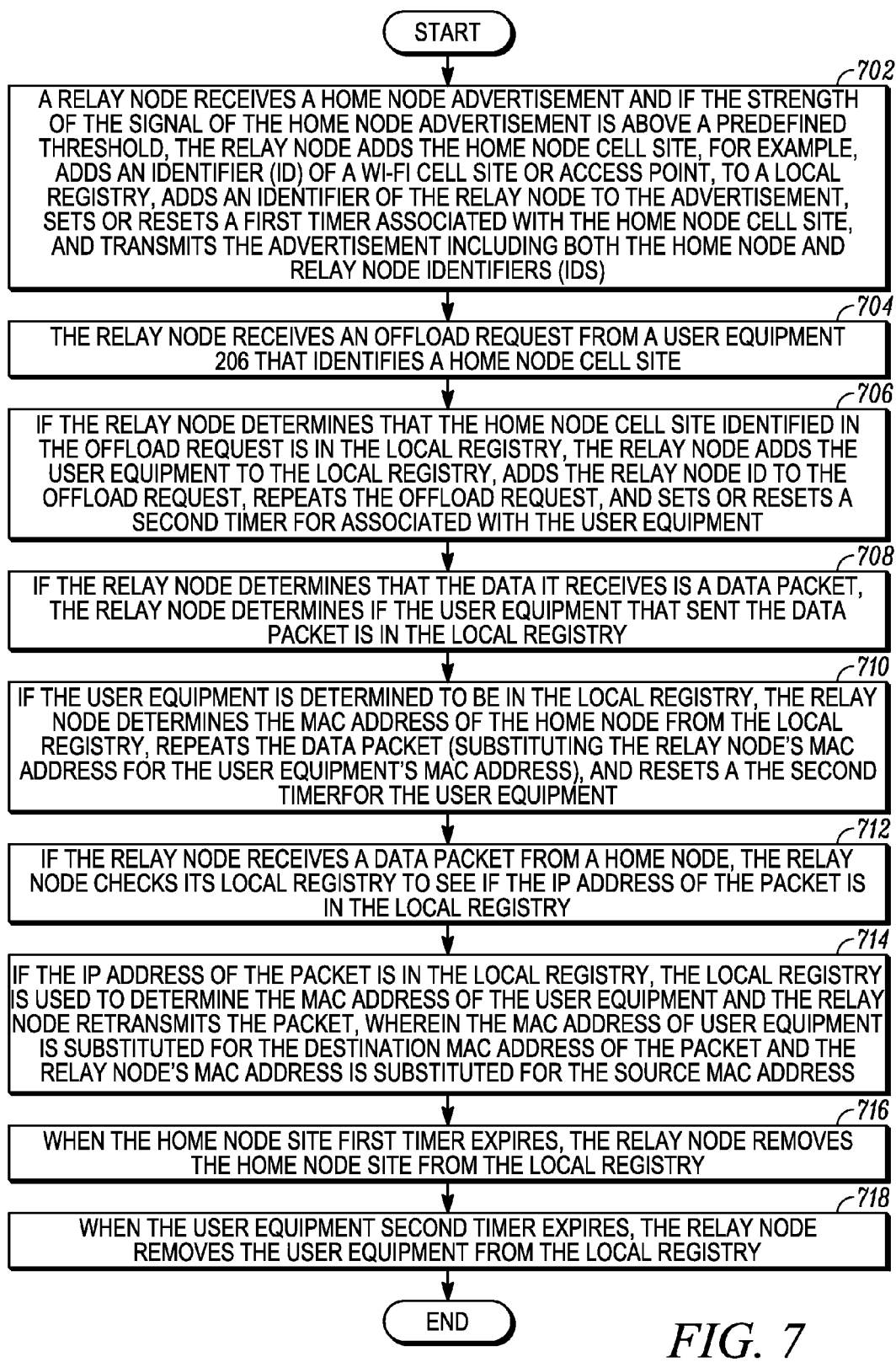
FIG. 7 is a flow diagram of operation in a relay node in accordance with some embodiments.

FIG. 7 is a flow diagram operation in a relay node, such as Wi-Fi routers 210-1, 210-2, and 210-3, in accordance with some embodiments. At 702, a relay node receives a home node advertisement and if the strength of the signal of the home node advertisement is above a predefined threshold, the relay node adds the home node cell site, for example, adds an identifier (ID) of a Wi-Fi cell site or access point, to a local registry, adds an identifier of the relay node to the advertisement, sets or resets a first timer associated with the home node cell site, and transmits the advertisement including both the home node and relay node identifiers (IDs). At 704, the relay node receives an offload request from a user equipment 206 that identifies a home node cell site. At 706, if the relay node determines that the home node cell site identified in the offload request is in the local registry, the relay node adds the user equipment to the local registry, adds the relay node ID to the offload request, repeats the offload request, and sets or resets a second timer associated with the user equipment. The local registry of the relay node is used to provide routing to the packets received. As such, the registry may hold the MAC layer and IP addresses of the user equipment and the MAC address of the Wi-Fi access point. At 708, if the relay node determines that the data it receives is a data packet, the relay node determines if the user equipment that sent the data packet is in the local registry. At 710, if the user equipment is determined to be in the local registry, the relay node determines the MAC address of the home node from the local registry, repeats the data packet (substituting the relay node's MAC address for the user equipment's MAC address), and resets the second timer. Likewise, at 712, if the relay node receives a data packet from a home node, the relay node checks its local registry to see if the IP address of the packet is in the local registry. At 714, if the IP address of the packet is in the local registry, the local registry is used to determine the MAC address of the user equipment and the relay node retransmits the packet, wherein the MAC address of user equipment is substituted for the destination MAC address of the packet and the relay node's MAC address is substituted for the source MAC address. At 716, when the first timer expires, the relay node removes the home node from the local registry. At 718, when the second timer expires, the relay node removes the user equipment from the local registry.

Figure 8:
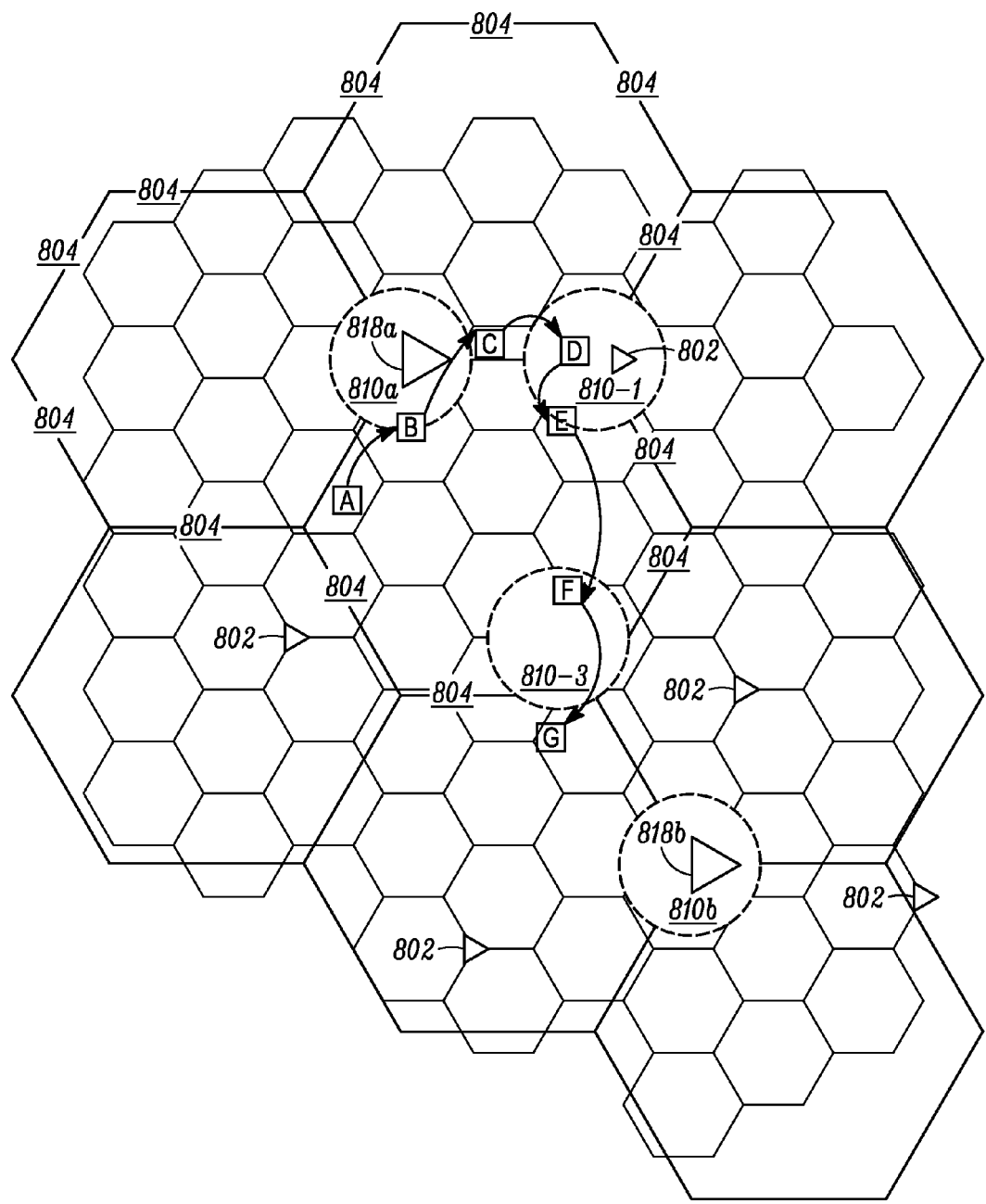
FIG. 8 is a flow diagram of movement of the user equipment through the LTE system in accordance with some embodiments.

FIG. 8 is a further block diagram of a broadband system used in accordance with some embodiments. The block diagram of FIG. 8 corresponds with the block diagram of FIG. 2, wherein cell site 218a and cell site 218b of FIG. 2 correspond with cell site 818a and cell site 818b of FIG. 8. Similar to cell sites 218a and 218b, each of cell sites 818a and 818b includes an eNB and its associated components, although the eNB and its associated components are not shown for the sake of simplicity. As such, each of cell sites 818a and 818b includes a Wi-Fi access point (not shown) that provides coverage to areas covered by cell sites 818a and 818b, for example, a Wi-Fi access point in cell site 818a provides coverage to area 810a. The coverage area of cell site 818a is defined within the area with bordering lines labeled as 804. FIG. 8 further includes Wi-Fi routers (not shown) that correspond to Wi-Fi routers 210-1 and 210-3 of FIG. 2 and that provide coverage to areas shown as 810-1 and 810-3. The Wi-Fi routers (relay nodes) providing coverage to areas 810-1 and 810-3 may communicate wirelessly with the Wi-Fi access point (home node) in cell site 810a because the access point-to-router range is greater than the access point/router-to-user equipment range since access point and router antennas may be mounted on towers or rooftops whereas the user equipment is generally at ground level. FIG. 8 also includes other cell sites 802, wherein signals from one or more of cell sites 802 may interfere with signals in one or more of coverage areas 810a, 810-1 and 810-3 and areas covered by cell sites 818a and 818b.

Consider that a user equipment enters coverage area 804 and, at point A, subsequent to the eNB in cell site 818a accepting a first connection request from the user equipment, the user equipment connects to the eNB in cell site 818a through the LTE air interface (i.e., the first air interface) and begins transferring data through the LTE air interface. As the user equipment moves through the coverage area, at point B, the user equipment receives the advertisements from the Wi-Fi access point in cell site 818a and sends a second connection request through the Wi-Fi air interface (i.e., the second air interface) to connect to Wi-Fi access point in cell site 818a. The LMM in cell site 818a routes the user equipment data through the Wi-Fi access point in cell site 818a until the user equipment moves out of the range of the Wi-Fi access point in cell site 818a. At point C, when the user equipment moves out of range of Wi-Fi access point in cell site 818a, the user equipment sends a Wi-Fi release message over the LTE air interface (i.e., the first air interface) to disconnect from the Wi-Fi access point in cell site 818a. At point D, the user equipment moves into the range of a first relay node that provides coverage for area 810-1 and connects to the eNB in cell site 818a through the first relay node. The LMM in cell site 818a sends data to the user equipment on the second air interface, that is, through the Wi-Fi access point in cell site 818a, the Wi-Fi access point in cell site 818a forwards the data to the first relay node, and the first relay node relays the data to the user equipment. Data from the user equipment is sent to the LMM in cell site 818*a* in the reversed order. So far, no mobility events have been registered in the LTE core network nor has the IP connection changed.

At point E, the user equipment moves out of range of the first relay node and reverts to using the LTE air interface (i.e., the first air interface) in cell site 818*a*. At point F, the user equipment moves to a site covered by a second relay node that provides coverage for area 810-3 and experiences interference based on, for example a signal sent from a cell site 802 in an adjacent spectrum with a higher density of sites. As a result, the user equipment cannot receive the signal from the LTE system in cell site 818*a*. The user equipment detects the advertisements for the eNB in cell site 818*a* from the second relay node and attaches, through the second air interface, to the LTE site in cell site 818*a* via the second relay node. Accordingly, the user equipment can continue to operate even though it is in an area with interference. At point G, when the user equipment moves out of coverage range of the second relay node and can no longer use the LTE site in cell site 818*a* because it is out of the coverage range of that LTE site, the user equipment is handed over to, for example, the LTE site in cell site 818*b*. The handover creates a mobility event at the core network. The mobility event in the LTE core network generates a mobility notification that is sent to the eNB in cell site 818*a* and the LMM in cell site 818*a* uses this notification to delete the user equipment from its Wi-Fi offload registry. It should be noted that the offload session would have eventually timed out anyway, but the mobility notification allows for a positive disconnection.

The LMM may use one or more criterion to determine if Wi-Fi offload should be performed. For example, the LMM may allow Wi-Fi offload on any user equipment that receives a Wi-Fi advertisement and sends a connect message to the LMM. One of ordinary skill in the art will realize that there may be additional criteria applied by the user equipment and/or LMM in deciding whether Wi-Fi offloading is appropriate for any particular situation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 20%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, the user equipment, the relay and home nodes, and/or local mobility manager of FIGS. 1 and/or 2 may comprise a set of instructions (perhaps stored in a volatile or non-volatile computer readable medium) that, when executed by a processor, perform some or all of the steps set forth in FIGS. 3-7 and the corresponding text. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising
receiving, at a first interface on a network node, a first connection request from a user equipment to join a broadband network:
accepting, by a mobility manager in the network node, the first connection request;
transmitting, by the mobility manager, data from a core network addressed to the user equipment through the first interface and receiving data from the user equipment through the first interface;
receiving, by the mobility manager from a local area network, a second connection request sent from the user equipment, wherein the second connection request is for the user equipment to communicate with the broadband network via the local area network and wherein the second connection request includes identification for at least one of a home node and a relay node in the local area network;
accepting, by the mobility manager, the second connection request;
offloading, by the mobility manager, data transmitted to and received from the user equipment to a second interface on the network node, without notifying a mobility element in the core network, wherein the second interface is configured to send data to and receive data from the user equipment via the local area network and wherein data offloaded to the second interface is transmitted via at least one of the home node and the relay node identified in the second connection request.

2. The method of claim 1, further comprising setting, by the mobility manager, an offload timer to expire after a defined time period subsequent to receiving the second connection request, wherein if the user equipment does not transmit data on the second interface within the defined time period, the mobility manager routes data addressed to the user equipment through the first interface.

3. The method of claim 2, further comprising receiving, by the mobility manager, a release message via the first interface when the user equipment goes out of coverage range of the local area network;
sending, by the mobility manager, data addressed to the user equipment and receiving data from the user equipment through the first interface; and
cancelling the offload timer.

4. The method of claim 1, further comprising determining, by the mobility manager, that data received on the first interface includes a release message, removing the user equipment from an offload registry, and cancelling a offload timer.

5. The method of claim 1, further comprising determining, by the mobility manager, that data received on the first interface includes the second connection request, resetting an offload timer, and adding the user equipment to an offload registry.

6. The method of claim 5, further comprising removing, by the mobility manager, the user equipment from the offload registry when the offload timer expires.

7. The method of claim 1, further comprising offloading, by the mobility manager, data transmitted to and received from the user equipment from the first interface to the second interface subsequent to receiving a notification of a mobility event from the core network.

8. An apparatus comprising:
a first interface configured to receive, from a user equipment, a first connection request to join a broadband network;
a mobility manager configured to accept the first connection request and send data from a core network addressed to the user equipment through the first interface and receive data from the user equipment through the first interface,
wherein the mobility manager further is configured to receive a second connection request from a local area network, the second connection request being for the user equipment to communicate with the broadband network via the local area network and wherein the second connection request includes identification for at least one of a home node and a relay node in the local area network; and
a second interface configured to send data to and receive data from the user equipment via the local area network, wherein subsequent to receiving the second connection request, the mobility manager is configured to offload data from the first interface to the second interface without notifying a mobility element in the core network and wherein data offloaded to the second interface is transmitted via at least one of the home node and the relay node identified in the second connection request.

9. The apparatus of claim 8, wherein the mobility manager is configured to offload data transmitted to and received from the user equipment from the first interface to the second interface subsequent to receiving a notification of a mobility event from the core network.

10. An apparatus comprising:
a first interface configured to receive, from a user equipment, a first connection request to join a broadband network;
a mobility manager configured to accept the first connection request and send data from a core network addressed to the user equipment through the first interface and receive data from the user equipment through the first interface,
wherein the mobility manager further is configured to receive a second connection request from a local area network, the second connection request being for the user equipment to communicate with the broadband network via the local area network;
a second interface configured to send data to and receive data from the user equipment via the local area network, wherein subsequent to receiving the second connection request, the mobility manager is configured to offload data from the first interface to the second interface without notifying a mobility element in the core network; and
wherein the mobility manager further is configured to set an offload timer to expire after a defined time period subsequent to receiving the second connection request, wherein if the user equipment does not transmit data on the second interface within the defined time period, the mobility manager routes data addressed to the user equipment through the first interface.

11. The apparatus of claim 10, wherein the mobility manager is configured to receive a release message via the first interface when the user equipment goes out of coverage range of the local area network and subsequent to receiving the release message, the mobility manager is configured to send data addressed to the user equipment and receive data from the user equipment through the first interface and cancel the offload timer.

12. The apparatus of claim 10, wherein the mobility manager is configured to determine that data received on the first interface includes the second connection request, reset the offload timer, and add the user equipment to an offload registry.

13. The apparatus of claim 12, wherein the mobility manager is configured to remove the user equipment from the offload registry when the offload timer expires.

14. An apparatus comprising:
- a first interface configured to receive, from a user equipment, a first connection request to join a broadband network;
- a mobility manager configured to accept the first connection request and send data from a core network addressed to the user equipment through the first interface and receive data from the user equipment through the first interface,
- wherein the mobility manager further is configured to receive a second connection request from a local area network, the second connection request being for the user equipment to communicate with the broadband network via the local area network;
- a second interface configured to send data to and receive data from the user equipment via the local area network, wherein subsequent to receiving the second connection request, the mobility manager is configured to offload data from the first interface to the second interface without notifying a mobility element in the core network; and
- wherein the mobility manager further is configured to determine that data received on the first interface includes a release message, remove the user equipment from an offload registry and cancel an offload timer.

15. A method comprising:
- receiving, at a relay node, a first advertisement from a broadband system and adding the broadband system to a local registry;
- receiving, at the relay node, an offload request from user equipment, wherein the offload request identifies the broadband system;
- determining, by the relay node, that the broadband system identified in the offload request is in the local registry, adding the user equipment to the local registry, and repeating the offload request received from the user equipment, wherein repeating the offload request comprises adding identification for the relay node to the offload request and repeating the offload request with the added identification for the relay node;
- receiving, at the relay node, a data packet and resetting a timer for the user equipment; and
- repeating, by the relay node, the data packet to one of a second relay node or a home node if the user equipment and the broadband system identified in the data packet is in the local registry.

16. The method of claim 15, wherein the receiving the first advertisement comprises adding identification for the relay node to the first advertisement and resetting a timer for the broadband system.

17. The method of claim 15, wherein the receiving the offload request comprises resetting the timer for the user equipment.

18. The method of claim 15, further comprising removing the broadband system from the local registry when timer for the broadband system expires and removing the user equipment from the local registry when the timer for the user equipment expires.

* * * * *

UNITED STATES PATENT AND TRADEMARK OFFICE
CERTIFICATE OF CORRECTION

PATENT NO. : 9,119,123 B2  
APPLICATION NO. : 13/799681  
DATED : August 25, 2015  
INVENTOR(S) : Bradley M. Hiben et al.

Page 1 of 1

It is certified that error appears in the above-identified patent and that said Letters Patent is hereby corrected as shown below:

IN THE DRAWINGS:

In FIG. 7, Sheet 7 of 8, for Tag "710", in Line 4, delete "A THE" and insert -- THE --, therefor.

In FIG. 7, Sheet 7 of 8, for Tag "710", in Line 5, delete "TIMERFOR" and insert -- TIMER FOR --, therefor.

IN THE SPECIFICATION:

In Column 3, Line 7, delete "diagram a broadband" and insert -- diagram of a broadband --, therefor.

In Column 3, Line 61, delete "diagram a broadband" and insert -- diagram of a broadband --, therefor.

In Column 5, Line 51, delete "operating code 306" and insert -- operating code 325 --, therefor.

In Column 7, Line 61, delete "LLM" and insert -- LMM --, therefor.

IN THE CLAIMS:

In Claim 1, Column 13, Line 7, delete "comprising" and insert -- comprising: --, therefor.

In Claim 4, Column 13, Line 54, delete "a offload" and insert -- an offload --, therefor.

Signed and Sealed this
Twenty-eighth Day of June, 2016

Michelle K. Lee
*Director of the United States Patent and Trademark Office*